(12) United States Patent
Yong et al.

(10) Patent No.: US 11,011,133 B2
(45) Date of Patent: May 18, 2021

(54) INFORMATION HANDLING SYSTEM DISPLAY AND CHARGER MANAGEMENT IN MULTIPLE DEVICE SCENARIOS

(71) Applicant: Dell Products L.P., Round Rock, TX (US)

(72) Inventors: Khang Chian Yong, Singapore (SG); Vui Khen Thien, Singapore (SG); Mandy Christina Phelps, Austin, TX (US); Theodore B. Pasquale, Leesburg, FL (US); Benedict Tiong Chee Tay, Singapore (SG)

(73) Assignee: Dell Products L.P., Round Rock, TX (US)

( * ) Notice: Subject to any disclaimer, the term of this patent is extended or adjusted under 35 U.S.C. 154(b) by 42 days.

(21) Appl. No.: 16/211,556

(22) Filed: Dec. 6, 2018

(65) Prior Publication Data

US 2020/0184921 A1    Jun. 11, 2020

(51) Int. Cl.
| | |
|---|---|
| *G09G 5/00* | (2006.01) |
| *G06F 3/14* | (2006.01) |
| *G06F 3/0482* | (2013.01) |
| *G06F 3/0481* | (2013.01) |
| *G06F 3/0484* | (2013.01) |

(52) U.S. Cl.
CPC ........... *G09G 5/006* (2013.01); *G06F 3/0482* (2013.01); *G06F 3/04817* (2013.01); *G06F 3/04847* (2013.01); *G06F 3/1423* (2013.01); *G09G 2354/00* (2013.01); *G09G 2360/08* (2013.01)

(58) Field of Classification Search
CPC .. G06F 16/9038; G06F 1/1632; G06F 3/0482; G06F 11/3051; G06F 11/3055; G06F 1/203; G06F 13/14; G06F 1/1654; G06F 1/3206; G09G 2370/12; H04N 21/485; H04N 21/25866; H04N 21/41265; H04N 21/44213

See application file for complete search history.

(56) References Cited

U.S. PATENT DOCUMENTS

| | | | | |
|---|---|---|---|---|
| 2009/0262135 | A1* | 10/2009 | Huston | .............. H04N 21/8153 345/629 |
| 2009/0322767 | A1* | 12/2009 | Douglas | ................. G09G 5/006 345/520 |
| 2015/0341571 | A1* | 11/2015 | Majid | .................... H04N 5/445 348/564 |
| 2016/0226713 | A1* | 8/2016 | Dellinger | ............ H04M 1/7253 |
| 2017/0103495 | A1* | 4/2017 | Sierra | ........................ G06T 1/20 |
| 2017/0295028 | A1* | 10/2017 | Pelissier | ................. H04L 12/10 |
| 2018/0024806 | A1* | 1/2018 | Fujino | ................... G06F 3/1423 345/1.1 |
| 2019/0260986 | A1* | 8/2019 | Chen | ..................... H04N 17/04 |

\* cited by examiner

*Primary Examiner* — Gerald Johnson
(74) *Attorney, Agent, or Firm* — Zagorin Cave LLP; Robert W. Holland

(57) ABSTRACT

Plural information handling system interfaces with a display through plural display ports result in selection at the display of a display source that presents display information and a display source selection user interface window. An end user seeking to charge a portable information handling system at a display port, such as a USB Type C port, can plug the portable information handling system into the display without disrupting presentation of display information by another information handling system that is interfaced with the display.

18 Claims, 4 Drawing Sheets

INFORMATION HANDLING SYSTEM DISPLAY AND CHARGER MANAGEMENT IN MULTIPLE DEVICE SCENARIOS

BACKGROUND OF THE INVENTION

Field of the Invention

The present invention relates in general to the field of information handling system visual presentations, and more particularly to an information handling system display and charger management in multiple device scenarios.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems generally integrate a battery that provides power to processing components during mobile operations. Typically, portable information handling systems charge the battery with an external power adapter, such as an AC-to-DC adapter that converts alternating current of a wall socket into direct current with voltage and current within defined constraints. When a portable information handling system couples with an external power adapter, external power is typically prioritized to run the processing components while excess external power is directed towards charging the battery. Generally, during an initial interface with the external power adapted, configuration information is exchanged that defines a charging configuration. In some instances, charging ports have a footprint that restricts charger connections to compatible charger plugs, such as barrel plugs. In other instances, standardized charging ports and plugs have defined voltage and current parameters so that any charger plug that fits into a compatible port will provide charge within constraints that are manageable by the information handling system, such as the charging constraints defined by the Universal Serial Bus (USB) standards.

Typically portable information handling systems include a port that supports an interface with a peripheral display to present visual information generated by the portable information handling system at the peripheral display. Generally, portable information handling systems integrate a display in the portable housing, however, integrated displays tend to have a smaller viewing surface so that end user's in a desktop environment often prefer larger peripheral displays if available. For example, a DisplayPort cable that extends from a peripheral display inserts into a DisplayPort port of the portable information handling system to initiate an automated configuration for presentation of visual images at the display by the portable information handling system. DisplayPort supports high resolution display presentation with four unidirectional lanes of serial display data and one bidirectional lane of configuration data.

Recently, industry has moved towards inclusion of display data with other data through a universal serial bus connector, such as the USB Type C connector. The USB Type C connector supports four data lanes of display data if needed while offering unused data lanes to perform other data transfers. One advantage of using a USB compatible port for interfacing an information handling system and display is that a single port in an information handling system supports display, data and power transfer functions. Many smaller portable information handling systems, such as tablets and smartphones, include only a single port in order to keep the housing footprint to a minimum. By including a single USB Type C port, these portable information handling systems include the functionality typically supported through multiple separate ports.

One difficulty that can arise with a multifunctional port, such as a USB Type C port, is that a portable information handling system may not understand what function(s) are desired from a port interface on initial detection of the interface. For example, if a peripheral display has a USB Type C port, the display may present visual information generated by a portable information handling system while also providing power through the USB interface that powers the information handling system and charges its battery. Generally, when the portable information handling system interfaces with the display, an automated transition is performed to place visual information of the portable information handling system on the display. In some instances, however, an end user may not want to present visual information at the display. For example, if an end user plugs a smartphone into a display to charge the smartphone, the end user may not want visual content of the smartphone presented on the display. In particular, an end user may already have an information handling system coupled to the display and presenting visual information that the end user prefers for presentation over the visual information of the smartphone.

SUMMARY OF THE INVENTION

Therefore, a need has arisen for a system and method which manages display and charger functions in multiple device scenarios.

In accordance with the present invention, a system and method are provided which substantially reduce the disadvantages and problems associated with previous methods and systems managing display and power functions in multiple device scenarios. Upon establishing an interface between a portable information handling system and a peripheral display, a determination of whether to present display information of the portable information handling system at the peripheral display depends in part on whether the display is configured to charge the portable information handling system. If so, a display source selection user interface presents to support end user interaction that confirms whether the display source should change in response to the detected information handling system interface or if charging should take place without presentation of display information from the information handling system.

More specifically, a peripheral display includes plural ports that interface with plural information handling systems including at least one port that charges an interfaced information handling system, such as a USB Type C port. Upon detection of an information handling system interface to the port that charges, a determination is made of whether another information handling system is presenting display information at the peripheral display, such as through another of the ports or a wireless interface. If so, since an end user may only desire a charge and not a change of display information presented at the display, a display source selection user interface provides the end user with an option to select the information handling system for presentation of display information while maintaining the display information presentation of the existing information handling system. An end user selection of the display source is stored so that at subsequent interfaces between the peripheral display and information handling system the stored selection may be used as a default response.

The present invention provides a number of important technical advantages. One example of an important technical advantage is that an information handling system selectively interfaces with a display to charge without presenting visual information at the display based upon end user preferences, context at the display, and historical use interactions. This allows an end user to leverage display charging capabilities for one information handling system without disrupting display presentation related to another information handling system. For example, if information handling systems that interface with a peripheral display do not request a charge, the display peripheral presents display information received from the most recent information handling system interface. If a display peripheral detects an interface with an information handling system that requests a charge, such as through a USB Type C port, the display peripheral selectively determines whether the end user likely seeks a charge only or both a charge and a presentation of display information. This allows an end user to continue using a peripheral display with an existing display presentation after plugging in a separate information handling system for charging only.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A display selects display information for presentation from one of plural information handling systems interfaced with each of plural ports of the display and provides a display source selection user interface window at the display for an end user to override the display selection. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
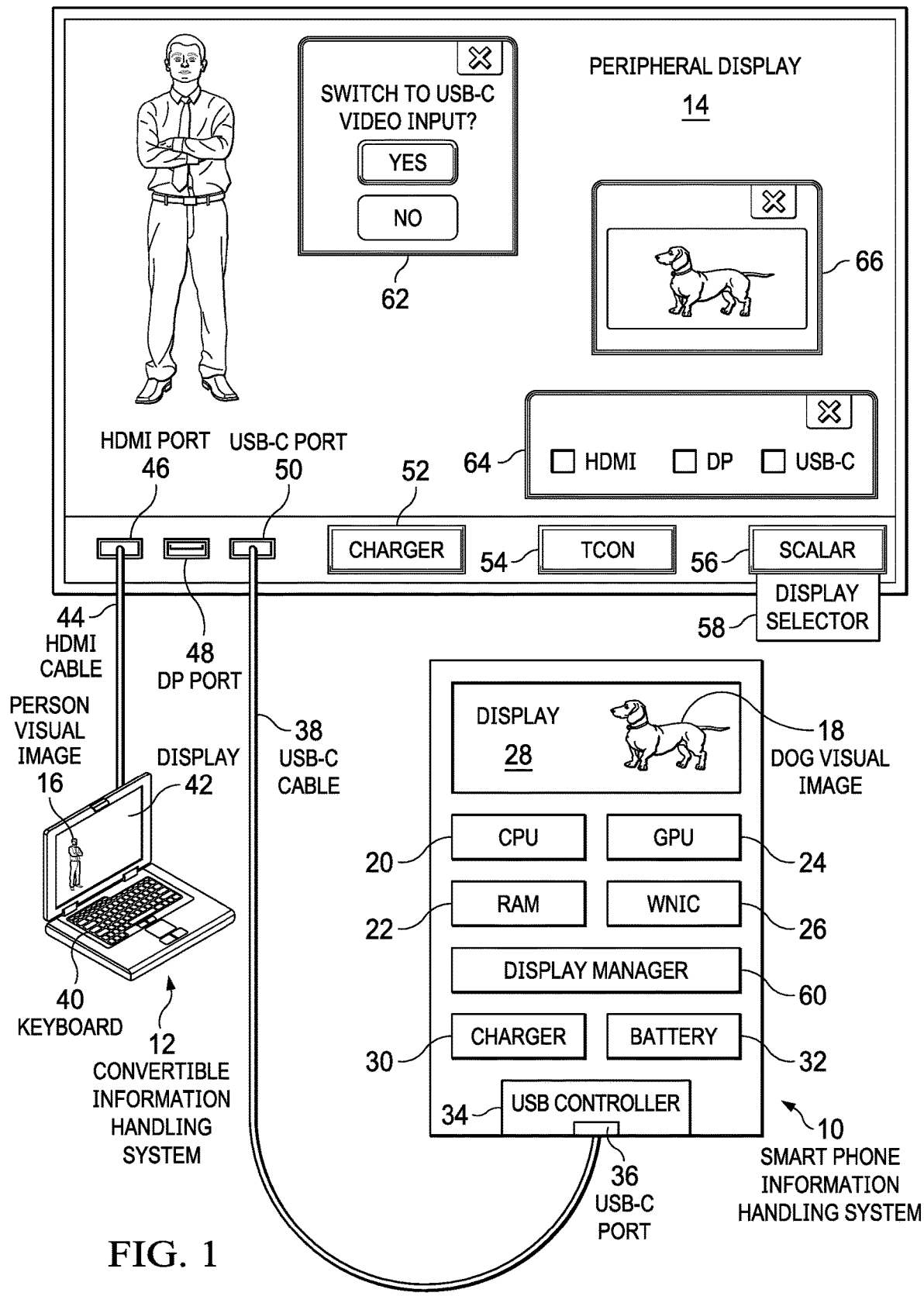
FIG. 1 depicts a block diagram of plural information handling systems interfaced with a display having a display source selection user interface that allows an end user to override a display's automated display information source selection.

Referring now to FIG. 1, a block diagram depicts plural information handling systems 10 and 12 interfaced with a display 14 having a display source selection user interface 62 that allows an end user to override a display's automated display information source selection. In the example embodiment, information handling system 10 has a mobile telephone configuration, information handling system 12 has a convertible configuration, and display 14 has a peripheral configuration, such as for a desktop environment. Peripheral display 14 offers a larger viewing area than is typically available in portable information handling systems, such as twenty-two inch or greater diagonal viewing area. In an enterprise or home environment, an end user plugs a portable information handling system into peripheral display 14 to have the greater display viewing area available in addition to an integrated display.

Information handling systems 10 and 12 integrate processing components in a portable housing to process information and output display information that defines visual images 16 and 18 for presentation at a display. As an example, mobile telephone information handling system 10 integrates a central processing unit (CPU) 20 that executes instructions to process information store in random access memory (RAM) 22. For example, an operating system and applications stored in persistent memory, such as a solid state drive, are retrieved to RAM 22 for execution by CPU 20 to generate information for presentation to an end user at an integrated display 28. For instance, a graphics processor unit (GPU) 24 interfaces with CPU 20 and RAM 22 to process information into pixel values that are communicated to an integrated display 28 for presentation of visual image 18. In the example embodiment, mobile telephone information handling system 10 includes a wireless network interface card (WNIC) 26 that supports wireless communication, such as through a wireless local area network (WLAN), a wireless wide area network (WWAN) and a wireless personal area network (WPAN). A charger 30 provides power to operate the processing components, such as from an integrated battery 32 or from an external power source interfaced through a USB Type C port 36 and a USB controller 34. When an external power source couples to port 36, charger 30 applies external power to operate the processing components while using excess power to charge battery 32.

Mobile telephone information handling system 10, sometimes also referred to as a smartphone, has a tablet configuration in which an integrated display 28 is exposed along one side over top of the processing components. Mobile telephone information handling system 10 has a housing sized for use as a headset with a minimal weight and thickness. Advantageously, USB Type C port 36 offers a flexible cable interface for power and data transfer, including display information transfer. For example, a USB Type C port supports information transfer with data lanes that comply to the DisplayPort standard so that GPU 24 can drive presentation of visual images at peripheral display 14. In order to maintain a minimal footprint convenient for use as a telephone, mobile telephone information handling system 10 includes only the one USB Type C port 36. In contrast, convertible information handling system 12 operates in clamshell laptop mode in which rotationally-coupled housing portions open to expose an integrated display 42 help in a viewing position over a keyboard 40. Although convertible information handling system 12 includes similar processing components to those of mobile telephone information handling system 10, a larger housing size tends to allow processing components having greater capabilities. For example, convertible information handling system 12 can include active thermal management by a cooling fan that supports processing components having greater power dissipation. In addition, a larger housing size allows convertible information handling system 10 to include multiple ports having a variety of capabilities. For example, convertible information handling system 12 may have a dedicated power port, multiple USB ports, multiple display ports compatible with multiple standards, etc. . . . The availability of multiple different types of ports provides greater flexibility for convertible information handling system 12 to interact with peripheral devices at enterprise or home office locations.

In the example embodiment, mobile telephone information handling system 10 interfaces with a USB Type C cable 38 to a USB Type C port 50 of peripheral display 14, and convertible information handling system 12 interfaces with an HDMI cable 44 to an HDMI port 46 of peripheral display 14. The simultaneous interface of multiple information handling systems at peripheral display 14 introduces an option for peripheral display 14 to present visual image 16 provided as display information from convertible information handling system 12 or visual image 18 as display information from mobile telephone information handling system 10. Selection of the visual image of interest to the end user without disruption of the end user's interaction with peripheral display 14 is managed by a controller integrated in peripheral display 14 that applies a variety of predetermined conditions and then offers the end user with an option to override the selection through a display source selection user interface window 62.

In the example embodiment, peripheral display 14 has three display ports that interface with information handling systems through display cables: an HDMI port 46, a DisplayPort port 48 and a USB Type C port 50. A charger 52 interfaces with USB Type C port 50 to providing functionality, such as a charging current to an information handling system that interfaces with port 50. A timing controller (TCON) 54 controls operations at peripheral display 14, such as by executing embedded code stored in flash memory or other types of non-transitory memory. In alternative embodiments, additional or other types of controllers may integrate in peripheral display 14 to provide functions described herein, such as a USB hub controller, a WNIC controller or other processing elements that execute code stored in non-transitory memory. A scalar 56 provides conversion of display information received through ports 46-50 from a transport resolution provided by an information handling system to a native resolution supported by display panel pixels integrated in peripheral display 14. In various embodiments, various combinations of processing and display elements may cooperate to present visual images at various types of display panels, such as CRT, LED and OLED display panels.

In the example embodiment, a display selector 58 stored in flash memory interfaced with scalar 56 executes on scalar 56 to manage selection of a display information source for presenting visual images at peripheral display 14. Display selector 58 may determine a display information source independently or in cooperation with a display manager 60 executing on information handling systems 10 or 12. Selection of a default information handling system to present display information may depend on a variety of conditions set forth as examples below. For instance, display selector 58 may present display information of the first information handling system detected as interfaced with a port 46-50 and maintain that presentation until overridden by an end user manual selection. As an alternative, a priority list of ports 46-50 determines which port provides a default display information if multiple ports are interfaced with multiple information handling systems. For instance, any information handling system interfaced with HDMI port 46 will have its display information presented as a priority over DisplayPort port 48 or USB C port 50 regardless of the order in which the ports interface; and any information handling system interfaced with DisplayPort port 48 will have priority over USB C port 50 regardless of the order in which the information handling systems interface. As another alternative, an information handling system that requests a battery charge from a port will have a lower priority over information handling systems that have an external power source and do not need power from peripheral display 14. As yet another alternative, an information handling system that identifies itself as a mobile phone may drop to a lower priority compared with other types of portable systems or desktop systems. For instance, a smartphone that uses a mobile device internet browser identifier may have a lower display presentation priority than a portable system that uses a desktop browser presentation. In various embodiments, display selector 58 uses available context to determine the most likely of plural information handling systems that an end user would like to view and presents that display information with a higher priority over display information that the end user is less likely to view. For instance, an operating system generated home page is likely of less interest to an end user than an application presentation, such as a word document or browser output, so that a context for selecting display information may include content presented at each of plural information handling systems interfaced with the display. Context and priority information may be provided to display selector 58 by a display manager 60 executing on each information handling system. In various embodiments, display selector 58 and display manager 60 cooperate to coordinate display selection as describe herein. For example, display manager 60 is an operating system driver that interacts with display selector 58 as defined by an operating system API.

Once display selector 58 selects a port to use as a default for display information, display selector 58 presents a display source selection user interface window 62 that allows an end user to override the default display information and present display information of a different port instead. In the example embodiment, HDMI port 46 has a higher priority than USB Type C port 50 so that visual image 16 is presented at peripheral display 14. Display source selection user interface 62 highlights an option "YES" to switch to USB-C input so that an end user's input will result in a change to presentation of display information received from information handling system 10 instead of information handling system 12. Detection of a "YES" input may be supported by a touch at peripheral display 14 if touchscreen functionality is supported, such as by applying touch controller detection at the depicted user interface to display selector 58. Alternatively, a BIOS driver or other physical interface of the information handling systems 10 and 12 may report an input to display selector 58 that initiates a change in the display information selected for presentation. Upon detection of the command to change the display information source, display selector 58 presents display information of the selected source instead of the default source. Display selector 58 stores the selection in flash memory so that the end user's preference may be considered at subsequent detection of that information handling system at peripheral display 14. If the end user does not select a change in display source within a predetermined time, such as five seconds, display source selection user interface 62 times out and is removed. Alternatively, hitting an escape key can release display source selection user interface 62 and maintain the default display source for presentation. In the example embodiment, two alternative display source selection user interfaces 64 and 66 are depicted. User interface 64 shows an image of each display port 46-50 and an indication of whether the display port has an information handling system interfaced and an indication of which port provides the display source. An end user selects a display source by selecting the desired port image. User interface 66 shows a small image of the display information of the non-selected port. For example, display information of information handling system 10 is provided to information handling system 12, which includes the image in the display information forward to peripheral display 14. Alternatively, scalar 56 reduces the resolution and size of display information provided from information handling system 10 and provides pixel values to TCON 54 that overrides the values provided from information handling system 12. Selection of user interface 66 results in a change in the display information used at display peripheral 14.

In operation, upon detection of a second information handling system interfaced with a port of peripheral display 14, display selector 58 chooses a default source for presentation of display information and presents display source selection user interface 62 for the end user to override the default selection if so desired. The override option is highlighted so that an entry by the end user will result in a change in the display source from the HDMI port 46 to the USB Type C port 50. If the display source is not changed in a predetermined time, such as five seconds, the override option user interface will fade off peripheral display 14. An end user's action at the last presentation of display source selection user interface 62 is stored for use as context to determine the default display information at the next dual display interface event. In one example embodiment, an end user may store default responses at peripheral display 14, such as defaulting to a USB Type C port as the default display information, defaulting away from a USB Type C port as the default display information so that any other interfaced display information has priority, or never defaulting to a USB Type C port display information for presentation even in a single interface situation so that the port may be used as a charging device without display interactions. In such a default setting, the display source selection user interface is not presented. In one embodiment, these default settings may be automatically updated if an end user manually changes a display source. For instance, if a mobile phone interfaced with a USB Type C port is defaulted to charge only but selected for presentation of display information by a manual user input, then at the next interaction with the mobile phone, the display information of the mobile phone defaults to presentation.

Figure 2:
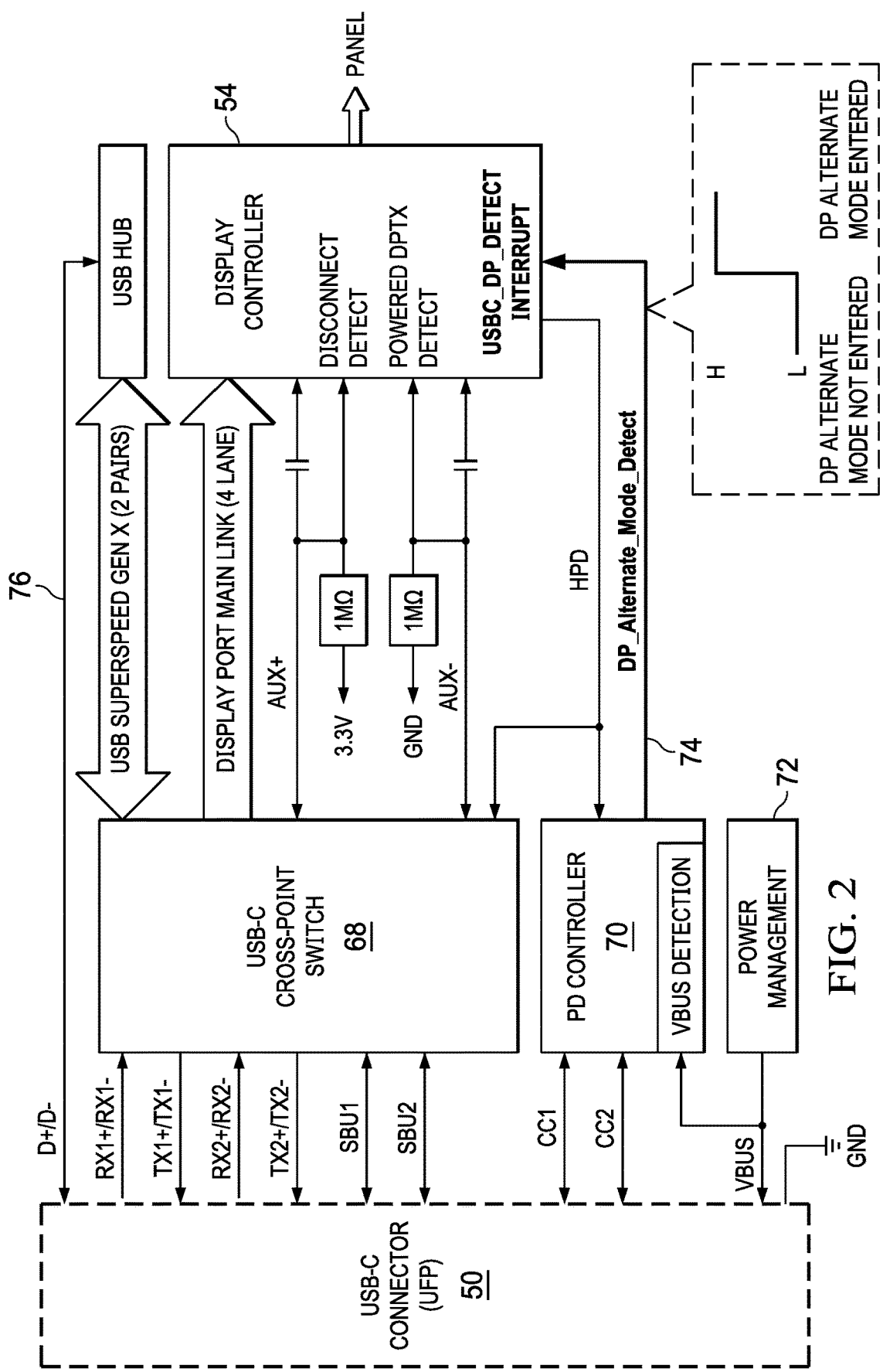
FIG. 2 depicts a circuit block diagram of a USB Type C port interface at a peripheral display.

Referring now to FIG. 2, a circuit block diagram depicts a USB Type C port 50 interface at a peripheral display. In the example embodiment, data communicates through a USB-C cross point switch 68 that configures data lanes to communicate USB or DisplayPort data. For instance, lower resolution display data may involve two lanes of DisplayPort data while other lanes are configured to support USB communication, while higher resolution display data may involve four data lanes used to communicate display data. A power transfer is coordinated by a power controller 70 and a power management interface 72. The configuration of data and power lanes are managed according to the USB specification, with USB hub 76 and display controller 54 receiving and managing data appropriately. In the example embodiment, a rising edge on a USB interrupt of display controller 54 from a DisplayPort alternate mode detect line 74 indicates that an information handling system interfaced with port 50 has setup DisplayPort alternative mode with PD controller 70. In the example embodiment, a DisplayPort Alternate Mode Event as indicated by the DP_Alternate_Mode_Detect rising to a high value triggers the presentation of a display source selection user interface as set forth in the process of FIG. 3.

Figure 3:
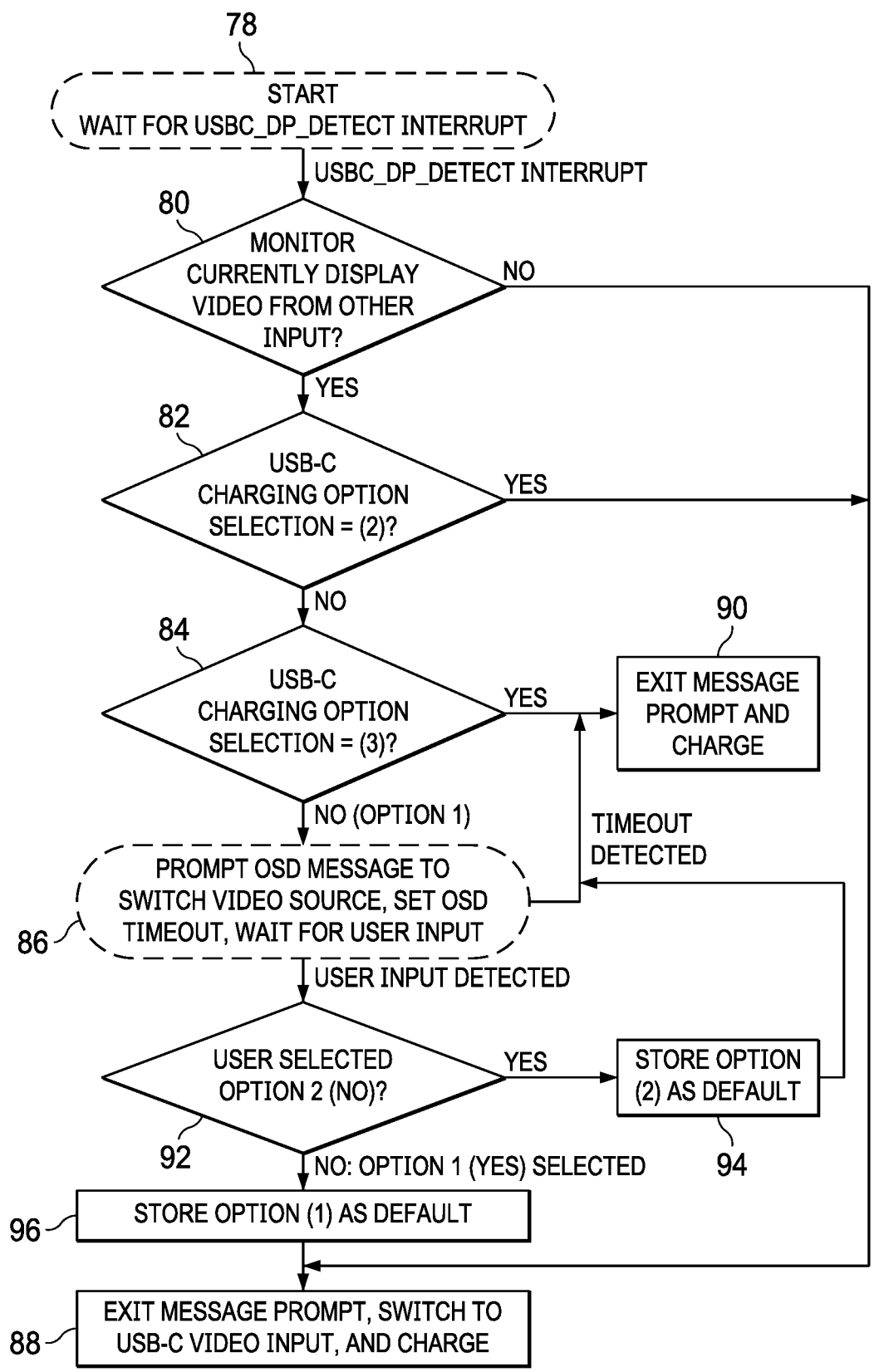
FIG. 3 depicts a flow diagram of a process for determining display information for presentation at a peripheral display.

Referring now to FIG. 3, a flow diagram depicts a process for determining display information for presentation at a peripheral display. The process starts at step 78 upon detection of a charge capability at the information handling system that interfaced with the USB Type C port. At step 80, a determination is made of whether the display monitor currently displays display information video from other input ports. If not, meaning only the USB Type C port receives display information, the process continues to step 88 to present the display information received at the Type C port at the display panel without presenting a display source selection user interface. At step 88, the display presents visual images from the one interfaced information handling system and establishes charging if requested. If at step 80 multiple information handling systems interface with the peripheral display, the process continues to step 82 to determine if a default value of "2" is set, which defaults to presentation of display information from the USB Type C port over other interfaces. If the USB Type C input is selected as the default, the process continues to step 88 to present the display information received at the USB Type C port. If at step 82 option 2 is not the default, the process continues to step 84 to determine if option "3" is the default, which indicates charging is available at the USB Type C port without presentation of display information received at the USB Type C port. If option "3" is selected as the default, the process continues to step 90 to charge through the USB Type C port without presenting a display source selection user interface.

If neither option "2" or option "3" is selected as the default at step 84, the process continues to step 86 and applies option "1." In the default option "1" the information handling system that is presenting display information continues to do so while a communication from the peripheral display through an operating system driver interface prompts presentation of a display sources selection user interface at the peripheral display. A timeout is set for selection of the display source change through the user interface, such as five seconds. If no user input is detected before the timeout, the process continues to step 90 to exit the display source selection user interface and continue with presentation of display information by the existing information handling system while charging the newly interfaced information handling system. Note that the request for a charge indicates that the end user may want a charge only interface so that a lack of a request for a charge at the newly interfaced port may be handled with a different default response, such as display of display information from the most recent connection. In addition, although the example embodiment relies upon driver interactions to support presentation of the display source selection user interface by the operating system, in alternative embodiments, logic on the display device may present the user interface and handle the display information selection.

If at step 86 a user input is detected, thus indicating a selection of display presentation of display information received through the USB Type C port, the process continues to step 92 to determine if the user selected no, indicating a desire to present the display information of the existing interface. If the user selected no, the process continues to step 94 to store option 2 as the new default and step 90 to support charging without presentation of display information received through the USB Type C port. If at step 92 the user selected yes indicating option 1, the process continues to step 96 to store option 1 as the default selection for application at the next detection of a USB Type C interface and continues to step 88 to switch the display information source to present display information received at the USB Type C port.

Figure 4:
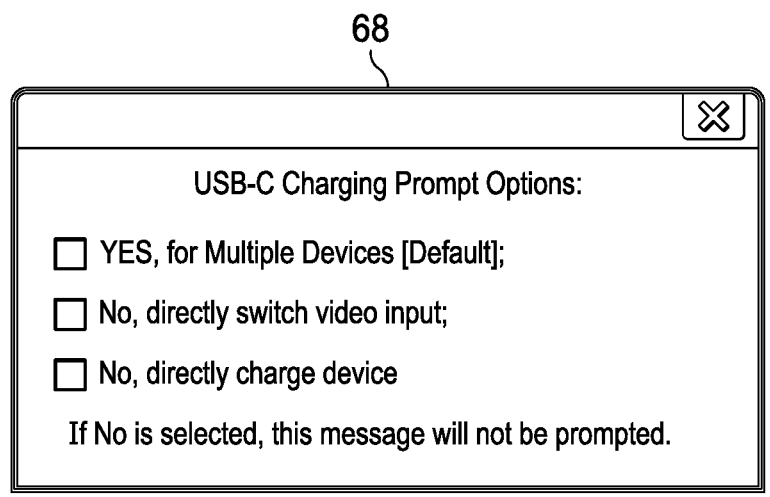
FIG. 4 depicts an example embodiment of a user interface that selects a display source.

In the above example, the options 1, 2, and 3, are separately programmable with a menu supported by the operating system driver and presented at the display. In the example above, the three options relate to the initial operation of user interface 68 at detection of a USB interface at the display and more specifically whether user interface 68, shown in greater detail by FIG. 4, is presented at an initial detection of a USB interface. User interface 68 highlights the "YES" option for selection in the event the end user presses enter. User interface 68 disappears without changing options 1, 2 and 3 if no selection is made in a defined time, such as five seconds. If the user toggles user interface 68 to the "NO" option and then presses enter, a separate selection is provided to allow the user to set a preference for the default display response. The default selection is option 1, which defines that user interface 68 will show on initial detection of a USB interface but not change the default source unless "YES" is selected. Option 2 defines that user interface 68 will not show on initial detection of a USB interface and that the display source will switch to the USB interface source. Option 3 defines that user interface 68 will not show on initial detection of a USB interface, that the display source will remain unchanged, and that the USB interface will provide a charge only. Thus, the end user may set an initial response that determines whether user interface 68 will show at all and whether a display source change is commanded when user interface 68 does not show or the interface is charge only. In alternative embodiments, other behaviors may be supported by default, such as whether a charge is provided to the device that initiated the USB interface or even if power is provided to the display. Additional programming of the default conditions may be supported by an information handling system operating system driver for an information handling system that is the display source. That is, the operating system driver may present its own default options, accept an end user default selection, and then set the default in the display even if only one display source is interfaced with the display. In one alternative embodiment, on detection of a USB display source, the display may communicate the availability of the USB display source to the information handling system acting as the display source to allow the information handling system to control display source selection through driver interactions.

Although the present invention has been described in detail, it should be understood that various changes, substitutions and alterations can be made hereto without departing from the spirit and scope of the invention as defined by the appended claims.

What is claimed is:

1. An information handling system comprising:
   a processor operable to process information with instructions;
   a memory interfaced with the processor and operable to store the information and instructions;
   a graphics processor interfaced with the processor and operable to convert the information into display values that define a visual image for presentation at a display;
   a communications controller interfaced with the graphics processor and operable to communicate the display information to a peripheral display for presentation of the visual image, the communications controller further operable to communicate power with the peripheral display;
   a peripheral display having plural communication ports, a charger and a controller, the peripheral display operable to present the display information received through the communications ports as the visual images and to provide power from the charger through one or more of the communications ports;
   a display selector stored in non-transitory memory of the peripheral display that when executed on the controller detects if plural display cables couple to the plural communications ports and in response selects one of the plural display cables as the primary display cable, presents visual images at the display of display information communicated through the primary display cable and presents a display source selection window at the display that accepts an end user display selection to override presentation of the primary display cable;
   a display manager stored in non-transitory memory that when executed on the processor communicates a mobile device indicator to the display selector, the display selector in response defaulting the information handling system to a lower display priority at the peripheral display.

2. The information handling system of claim 1 wherein the display selector when executed on the controller further:
   stores an end user display selection at the display source selection window; and
   applies the stored end user display selection as a default at a subsequent detection of plural display cables coupled to the display.

3. The information handling system of claim 1 wherein the communications controller coordinates power transfer from the display charger through the display cable, the display selector in response defaulting the information handling system to a lower display priority at the peripheral display.

4. The information handling system of claim 1 wherein the communications controller comprises a USB Type C controller.

5. The information handling system of claim 1 wherein the display selector is further operable to forward display information received at a first of the plural display communications ports that is not presented at a display to a second of the plural display communications ports for communication to a second information handling system that is presenting display information at the display.

6. The information handling system of claim 5 wherein the second information handling system includes the forwarded display information in the presented display information.

7. The information handling system of claim 1 wherein the display selector presents an image at the display having a depiction of each of the plural communications ports and highlighting which of the plural communications ports are receiving display information.

8. A method for presenting information at a peripheral display, the method comprising:
    interfacing a first information handling system with a first port of the display;
    sending first display information to the first port of the display;
    presenting the first display information as visual images at the display;
    interfacing a second information handling system with a second port of the display;
    in response to interfacing a second information handling system, defaulting at the display to presentation of display information from one of the first and second information handling systems based at least in part upon whether the first and second information handling systems request a charge from a charger of the display;
    in response to interfacing a second information handling system, presenting a display source selection user interface at the display; and
    accepting an end user display source selection through the display source selection user interface to present display information from a selected of the first or second information handling system.

9. The method of claim 8, further comprising:
    storing at the peripheral display a port priority by port type; and
    in response to interfacing a second information handling system, presenting second display information of the second information handling system if the second port has a type of higher priority than the first port.

10. The method of claim 9 wherein the port types include USB Type C as the lowest priority of the port types.

11. The method of claim 8 further comprising:
    timing presentation of the display source selection user interface; and
    removing the display source selection user interface after a predetermined time.

12. The method of claim 8 wherein the response to interfacing a second information handling system, presenting a display source selection user interface further comprises:
    presenting an icon depicting each display port by port type; and
    indicating at each icon a status associated with each display port.

13. The method of claim 8 further comprising:
    communicating second display information from the second information handling system to the first information handling system; and
    including the second display information in the first display information to present the second display information at a portion of the display.

14. The method of claim 8 further comprising:
    storing at the peripheral display the end user display source selection; and
    in response to a subsequent interfacing of a second information handling system, defaulting to presentation of display information by the stored display source selection.

15. The method of claim 8 further comprising:
    in response to interfacing a second information handling system, retrieving an information handling system type from the second information handling system; and
    comparing the information handling system type of the second information handling system against an information handling system type of the first information handling system to select one of the first or second information handling system display information for presentation at the peripheral display.

16. A peripheral display device comprising:
    a controller operable to execute instructions;
    plural ports, each port operable to accept a display cable communicating display information that defines visual images for presentation at a display panel;
    a charger interfaced with at least one of the plural ports and operable to provide power to an external information handling system; and
    a display selector stored in non-transitory memory that when executed on the controller:
    detects first and second information handling systems interfaced with first and second of the plural ports;
    selects display information from one of the first or second information handling systems for presentation as visual images based upon one or more predetermined conditions; and
    presents a display source selection user interface that accepts an end user command to override the selected display information by presenting the display information of the other of the first or second information handling systems for presentation as visual images;
    wherein the one or more predetermined conditions comprise a charge request communicated from one of the first and second information handling systems, the charge request applied as a lower priority for presenting visual images.

17. The peripheral display of claim 16 wherein the one or more predetermined conditions comprise an information handling system type communicated from each of the first and second information handling systems.

18. The peripheral display of claim 16 wherein the display selector further:
    stores a display source selection by an end user at the display source selection user interface; and
    applies the stored display source selection as a predetermined condition.

* * * * *